United States Patent [19]

Pagnoni

[11] Patent Number: 4,574,818
[45] Date of Patent: Mar. 11, 1986

[54] DEVICE FOR TRANSFERRING ROD-LIKE ARTICLES

[75] Inventor: Loris Pagnoni, Bologna, Italy
[73] Assignee: Sasib S.p.A., Bologna, Italy
[21] Appl. No.: 402,341
[22] Filed: Jul. 27, 1982
[30] Foreign Application Priority Data
Jul. 28, 1981 [IT] Italy .................. 12597 A/81
[51] Int. Cl.[4] .................. A24C 5/35; A24C 5/32; A24C 5/33
[52] U.S. Cl. .................................. 131/282
[58] Field of Search ............. 131/282, 283; 198/480, 198/478, 689, 800

[56] References Cited

U.S. PATENT DOCUMENTS

| | | | |
|---|---|---|---|
| 3,039,606 | 6/1962 | Dearsley | 131/282 |
| 3,447,679 | 6/1969 | Molins et al. | 131/282 |
| 3,913,724 | 10/1975 | Verjux | 198/480 |
| 4,408,621 | 10/1983 | Schumacher | 131/282 |

Primary Examiner—V. Millin
Assistant Examiner—H. Macey
Attorney, Agent, or Firm—Spencer & Frank

[57] ABSTRACT

A device for transferring rod-like articles, particularly cigarettes, from a rectilinear horizontal path to a rotary fluted drum having its axis of rotation substantially parallel to the rectilinear path. The device has two main rotary elements which rotate on two fixed shafts and which are coupled by at least one pair of main double cranks each having an arm integral with two crank pins to form an articulated parallelogram type rotary system. A crank pin of at least one main double crank extends beyond the respective main rotary element and ends with an eccentric pin to form a pair of parallel orbiting axes which carry respective secondary rotary elements coupled by at least one pair of secondary double cranks to form a second articulated parallelogram type rotary system. The crank pin of at least one second double crank extends beyond the respective secondary rotary element to form an extension on which there is a pneumatic pick-up or a suction head. The other secondary rotary element is rotated and coupled to the fixed main shaft about which it rotates.

6 Claims, 2 Drawing Figures

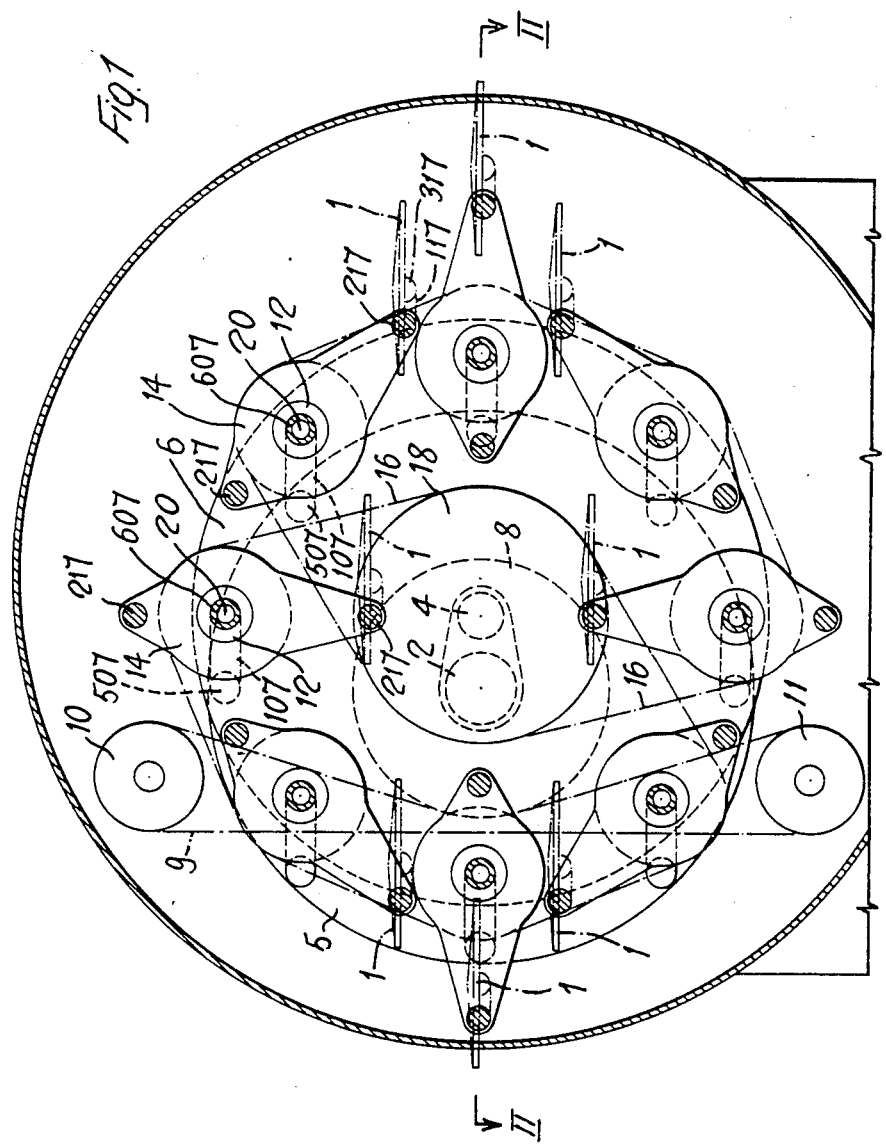

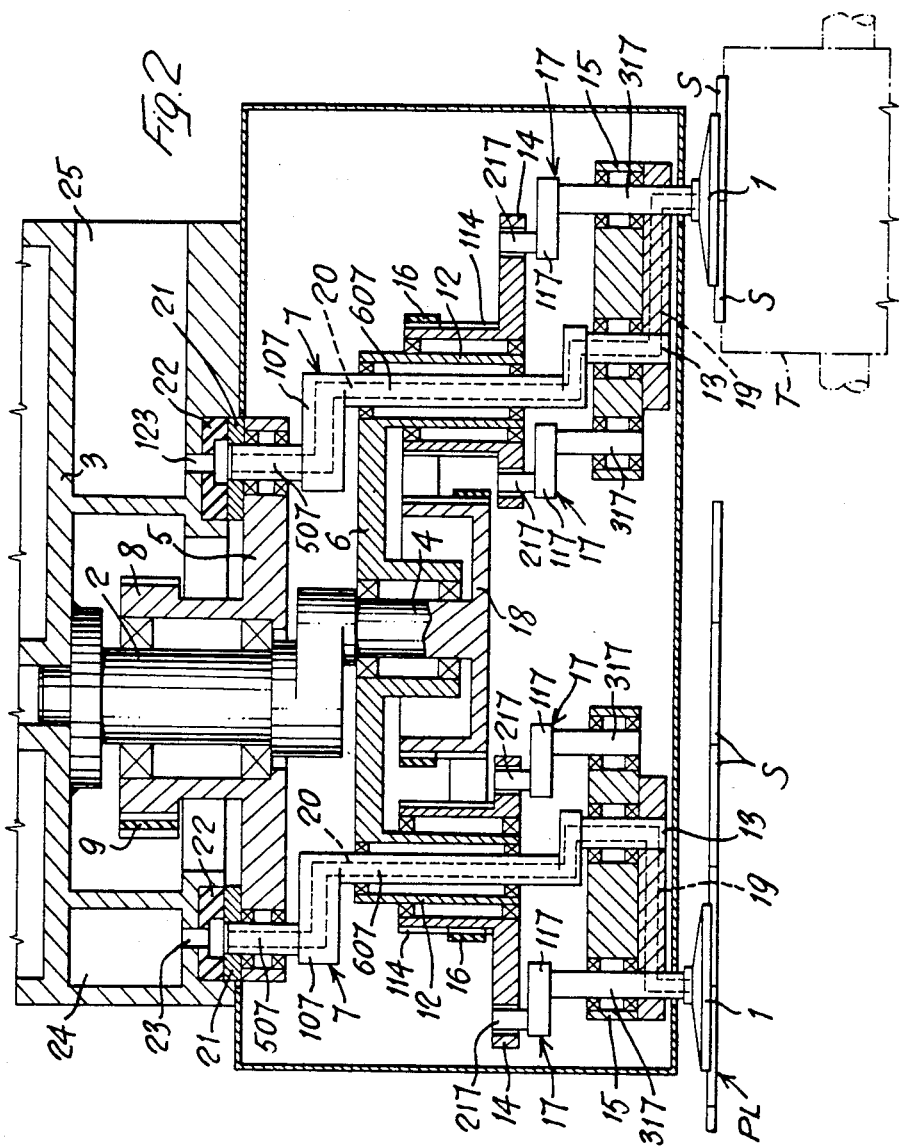

DEVICE FOR TRANSFERRING ROD-LIKE ARTICLES

BACKGROUND AND SUMMARY OF THE INVENTION

The present invention relates to a device for transferring rod-like articles, and particularly cigarettes, from a longitudinal rectilinear supply path, which is preferably substantially horizontal, along which the rod-like articles move in their axial direction and are aligned, to a subsequent path which is transverse to the supply path and along which the rod-like articles move in a direction transverse to their axes and are preferably carried by a fluted drum the axis of rotation of which is substantially parallel to the longitudinal rectilinear supply path of the rod-like articles. The transferring device comprises one or more pneumatic pick-up heads, or suction heads, which are adapted each one to carry at least one rod-like article, and are directed parallelly to the longitudinal rectilinear supply path of the said articles. The said suction heads are moved by means of a control device in such a manner as to be maintained always parallel to one another, and to move along a closed circuit path, more particularly an elliptical path which is substantially tangent to the longitudinal rectilinear supply path at a pick-up zone, where each suction head takes up due to suction at least one oncoming rod-like article, while the said elliptical path is contained in a plane which is tangent to the starting point of the subsequent transverse path and more particularly in a plane tangent to a generatrix of the said fluted drum at a delivery zone, where each suction head deposits the rod-like article onto the subsequent transverse path and particularly inside a flute of the said fluted drum.

Transferring devices of the above mentioned type are known, in which there is provided for just one suction head, the closed circuit path of which is contained in a plane substantially vertical and consists of an elliptical path having its major axis substantially horizontal. The pick-up zone of the rod-like articles from the longitudinal rectilinear supply path is located at one extremity of the minor vertical axis of the said elliptical path, while the delivery zone of the articles to the subsequent transverse path, and more particularly to the fluted drum, is located at one extremity of the major horizontal axis of the elliptical path. The mechanism for driving the suction head is realized in such a manner that, at the extremities of the minor axis of the elliptical path and consequently at the pick-up zone of the articles from the horizontal rectilinear supply path, the suction head presents a linear speed which is parallel and substantially equal or slightly greater than the speed of the articles arriving along the longitudinal rectilinear path, while at the extremities of the major axis of the elliptical path, and consequently at the delivery zone, the suction head presents a linear speed parallel and substantially equal to the peripheral speed of the fluted drum.

The above mentioned known-type device presents the advantage that while the suction head moves along the arc of the elliptical path between the pick-up zone and the delivery zone, the horizontal component of the tangential speed of the suction head decreases very gradually, and accordingly the increase of the vertical component of said speed is also gradual. In this manner, and particularly whenever the rod-like articles carried by the mentioned transferring device are cigarettes, damage to the said cigarettes is avoided, and more particularly the dribbling out of tobacco from the cigarette ends is eliminated, thanks to the reduction of the accelerations and decelerations of the suction head and particularly thanks to the graduality of the reduction of the horizontal component of the tangential speed of the suction head itself.

The known device of the above mentioned type presents one single suction head, and consequently can be employed in case of not too high speeds of the rod-like articles arriving on the longitudinal rectilinear supply path. Moreover, the mechanism which is utilized in this known device for the movement of the suction head along an elliptical path, is rather complicated in its construction, which is based on gear trains, and consequently is also noisy.

The purpose of the present invention is to eliminate the above inconveniences, by providing a transferring device of the above described type, which, besides the possibility of presenting a plurality of suction heads and therefore of maintaining within acceptable limits the values of the accelerations and of the decelerations to which the rod-like articles are subjected during their transfer even at higher supply speeds of the said articles along their longitudinal rectilinear path, presents also a more simple and less noisy constructive realization, is less expensive in construction and easier in maintenance.

The mentioned purpose is attained by providing, in accordance with the present invention, a transferring device of the above mentioned type which is substantially characterized by the fact that it comprises two main rotary elements of which one is driven into rotation by suitable driving means, and which are rotatably mounted on two fixed shafts parallel and spaced apart, said main rotary elements being coupled with each other by means of at least one pair of main double cranks consisting each of an arm integral with two opposed crank pins which rotatably engage the two main rotary elements facing each other, so as to form a first rotary system of the articulated parallelogram type, in which the arms of the main double cranks are maintained always parallel to one another, while a crank pin of at least one main double crank is extended beyond the respective main rotary element and terminates with a pin arranged in eccentric position, so as to form a pair of orbiting axes parallel and spaced between each other, onto which there are rotatably mounted two secondary rotary elements coupled between each other by at least one pair of secondary double cranks so as to form a second rotary system of the articulated parallelogram type, the crank pin of at least one secondary double crank extending beyond the respective secondary rotary element so as to form an extension on which there is secured a pneumatic pick-up or suction head, while the other secondary rotary element is driven into rotation and is coupled in such a manner to the fixed main shaft around which it orbits, so as to rotate around intsel upon rotation of the main rotary elements, and more particularly to rotate around itself with an angular speed which is equal but contrary to that of the said pair of main rotary elements.

Preferably, according to one preferred embodiment of the invention, the secondary rotary element driven into rotation is coupled with the fixed shaft around which it orbits, by means of a toothed belt passed around a toothed pulley integral with the said secondary rotary element and passed around a toothed pulley integral with the said fixed shaft and having a diameter double than the diameter of the said first toothed pulley.

BRIEF DESCRIPTION OF THE DRAWINGS

The above and other characteristic features of the invention, and the advantages deriving therefrom, will appear evident from the following detailed description of a preferred embodiment, illustrated by way of non-limiting example with reference to the annexed drawings, in which:

FIG. 1 shows diagrammatically in front elevation a transferring device according to the invention, for transferring cigarettes.

FIG. 2 is a horizontal section along line II—II of FIG. 1.

DESCRIPTION OF THE PREFERRED EMBODIMENT

With reference to the drawings, the illustrated device is intended for transferring the cigarettes S from a rectilinear axial path PL, so-called "longitudinal" and preferably horizontal, along which the cigarettes S move in their axial direction and aligned, onto a rotary fluted suction drum T, the axis of rotation of which is substantially parallel to the said rectilinear longitudinal path PL, and which feeds the cigarettes S, in a direction transverse to their axis, along a path which is transverse with respect to the mentioned rectilinear longitudinal path. The mentioned transfer of the cigarettes S is effected by means of a plurality of pneumatic pick-up heads (called suction heads) 1, which are adapted each one to carry two aligned cigarettes simultaneously and which move parallelly to each other along an elliptical path as it appears evident from FIG. 1 by looking at the instantaneous position of the illustrated suction heads 1.

The elliptical path of the suction heads 1 is contained in a substantially vertical plane and is arranged in such a manner that its major axis is substantially horizontal. The pick-up zone of the cigarettes S by the suction heads 1 from the rectilinear longitudinal horizontal path PL is located at one extremity (upper or lower) of the minor axis (which is substantially vertical) of the said elliptical path, while the delivery zone of the cigarettes from the suction heads 1 onto the fluted drum T is located at one of the extremities of the major axis (which is substantially horizontal) of the said elliptical path (at the right hand in the Figures). The elliptical path of the suction heads 1 is therefore substantially tangent to the longitudinal rectilinear path PL of the oncoming cigarettes S, while the plane in which the said elliptical path lies, is substantially tangent to a generatrix of the fluted drum T. In the pick-up zone of the cigarettes S from the longitudinal rectilinear inlet path PL, the suction heads 1 are connected to a source of vacuum so as to pick up by suction the cigarettes S. In the delivery zone of the cigarettes S to the fluted drum T, the suction to the suction heads 1 is cut off and consequently the cigarettes S are deposited inside the flutes of the drum T, where they are kept by suction, in a known manner.

The mechanism which causes the movement of the suction heads 1 along the said elliptical path comprises a first shaft 2 fixedly mounted on and projecting from the frame 3 of the machine, and perpendicular to the vertical plane which contains the said elliptical path. At its free end, the said first fixed shaft 2 carries a second fixed shaft 4, which is parallel but eccentric with respect to the said first shaft 2. On the first fixed shaft 2 there is rotatably mounted a first main rotary element 5, consisting for example of a disk. An analogous second main rotary element 6 is rotatably mounted on the second fixed shaft 4.

The two main rotary elements 5 and 6 are coupled to each other by means of a plurality of main double cranks 7. In the illustrated embodiment there are provided eight main double cranks 7, angularly equispaced between one another. Each main double crank 7 consists of an arm 107 integral with two opposed crank pins 507 and 607 of which the first pin 507 is rotatably mounted in the first main rotary element 5 and the second pin 607 is rotatably mounted in the second main rotary element 6. The arms 107 of the main double cranks 7 are directed in the same direction and are parallel to one another. The first main rotary element 5 is integral with a toothed pulley 8, which is engaged by a belt 9 which is toothed on both faces and is driven around two toothed pulleys 10 and 11, of which one pulley is a driving pulley. In this manner, the first main rotary element 5 is entrained into rotation around the first fixed shaft 2, thus driving on its turn into rotation by means of the main double cranks 7 and around the second fixed shaft 4, also the second main rotary element 6. The two main rotary elements 5, 6 and the main double cranks 7 form a first rotary system of the articulated parallelogram type, so that the arms 107 of the double cranks 7 remain parallel to one another during the rotation.

The crank pins 607 of the main double cranks 7, which are rotatably engaged in the second main rotary element 6, are extended through a coaxial sleeve 12 integral with the said main rotary element 6, so as to constitute each a first spindle which projects out of the side of the said second main rotary element 6 opposed to the first main rotary element 5, and orbits around the fixed shaft 4. The said orbiting spindle 607 terminates at is free end with an eccentric pin 13 which constitutes a further orbiting spindle parallel to the first spindle 607 and eccentric thereto. Onto each sleeve 12 of the second main rotary element 6, and consequently practically on the orbiting spindle consisting of the crank pin 607 of each main double crank 7, there is rotatably mounted a first secondary rotary element 14 while on the parallel orbiting spindle consisting of the respective pin 13 there is rotatably mounted a further secondary rotary element 15. In the illustrated embodiment there are provided in total eight pairs of secondary rotary elements 14, 15. The two secondary rotary elements of each pair of said elements are coupled with each other by means of a plurality of secondary double cranks 17, angularly equispaced between one another. In the illustrated embodiment, for each pair of secondary rotary elements 14, 15 there are provided a pair of secondary double cranks 17, but the said cranks 17 may be four, or even more.

Each secondary double crank 17 consists (similarly to the main double crank 7) of an arm 117 integral with a pair of opposite crank pins 217 and 317 which rotatably engage, the first one 217 the first secondary rotary element 14, and the other one 317 the second secondary rotary element 15. The arms 117 of the secondary double cranks 17 are directed in the same direction and are parallel to each other. The first secondary rotary element 14 is integral with a toothed pulley 114 which is coupled by means of a toothed belt 16, with a toothed pulley 18 which is fixed on the fixed shaft 4, around which there orbit the pairs of secondary rotary elements 14, 15. In the illustrated embodiment, around the toothed pulley 18 of the fixed shaft 4 there are passed two toothed belts 16 arranged side by side which engage each one the toothed pulleys 114 of the secondary rotary elements 14 of one half of the pairs of secondary rotary elements 14, 15, as it appears evident particularly from FIG. 1. The diameter of the toothed pulley 18 on the fixed shaft 4 is twice as great as the diameter of each of the toothed pulleys 114 integral with the secondary rotary element 14. Each pair of secondary rotary elements 14, 15 and the interposed secondary double cranks 117 form as a whole a second rotary system of the articulated parallelogram type, so that the arms 117 of the secondary double cranks 17 are maintained parallel to each other during the rotation. Inside each one of these systems, that is in each pair of secondary rotary elements 14, 15, the crank pin 317 of one of the secondary double cranks 117 is passed through the respective secondary rotary element 15 and projects forwardly with respect to same. On the said free forward end of the said crank pin 317 there is secured the respective suction pick-up head 1.

By causing the rotation, by means of the toothed pulley 8, of the first rotary element 5 at constant angular speed, also the second main rotary element 6 rotates with the same angular speed, thus entraining into orbital motion the main double cranks 7 and the end pins 13 of the crank pins 607, the arms of which are maintained always parallel to each other, and for example they maintain their horizontal direction. More particularly, the spindle 607 describes a circumference having radius R1 around the fixed shaft 4. In consideration of the fact that the toothed pulley 18 is fixed and the transmission ratio between the toothed pulleys 114 and 18 is equal to 2 the pairs of secondary rotary elements 14, 15 rotate each around their own axes 12 (i.e. 607) and 13 with an angular speed which is equal but contrary to the angular speed of the pair of main rotary elements 5, 6. Consequently, the crank pin 317 forming part of a secondary double crank 17 of each pair of secondary rotary elements and carrying a suction head 1, rotates around axis 13 at the same angular speed as the speed of the pair of main rotary elements 5, 6 but in contrary direction. As a consequence, each crank pin 317 and each suction head 1 follow an elliptical path having a major horizontal axis of length 2 (R1+R2) and a minor vertical axis of length 2 (R1−R2) where R2 is the radius of rotation of the crank pin 317 around axis 13. In consideration of the fact that during the rotation of the secondary rotary element 14, 15, the arms 117 of the secondary double cranks 17 are maintained always parallel to one another, the suction heads 1 will also be kept parallel to one another, and more particularly they will remain directed horizontally throughout the whole elliptical path.

Each suction head 1 communicates, through a duct 19 provided in the respective secondary rotary element 15, with a duct 20 which is provided in the pin 13 and in the crank pin 607 and extends also inside the arm 107 of the corresponding main double crank 7 as well as into the other crank pin 507, engaging the first main rotary element 5. The said first main rotary element 5 carries on its rear side, opposed to the second main rotary element 6, a seal ring 21 which slides on an opposed seal ring 22 secured to the machine frame 3 and provided with a slot consisting of at least two subsequent and concentric circular sectors 23, 123 separated between each other. In the zones of said slot sectors 23, 123 of the opposed seal ring 22, on the seal ring 21 rotating together with the element 5, there open the ducts 20 of the crank pins 507 of all the main double cranks 7. Whenever the suction heads 1 are in the collecting or pick-up zone of the cigarettes S from the rectilinear longitudinal path PL, and throughout the whole path followed by the said suction heads 1 from the said pickup zone to the delivery zone of the cigarettes S onto the fluted drum T, the apertures of the respective ducts 20 on the seal ring 21 are located within a slot sector 23 of the opposed seal ring 22, which communicates with a vacuum chamber 24, so that the suction head 1 exert a sucking action. Whenever, on the contrary, the suction heads 1 come to be located in the delivery zone of the cigarettes S onto the fluted drum T, the apertures of the respective ducts 20 on the seal ring 21 come to be located within a slot sector 123 of the opposed seal ring 22, which communicates with a chamber 25 communicating with the atmospheric pressure, or inside which chamber 25 there is maintained a slight pressure, so as to cut off the suction from the suction heads 1 or even to exert a slight blow through same in order to better discharge the the cigarettes.

Of course, the invention is not limited to the just described and shown embodiment, but many variations and modifications, particularly from the constructive point of view, are possible. For example, any other suitable distributor means can be provided for applying suction to the suction heads 1. The transmission between the toothed pulleys can be effected by any suitable gear train, instead than by using the toothed belts. The first main rotary element 5 and the second main rotary element 14 may be driven into rotation by any other suitable driving means. For the coupling of the fixed toothed pulley 18 with the toothed pulleys 114 of the secondary rotary elements 14 there can be used more than two toothed belts 16 arranged side by side. The main rotary elements 5, 6 and the secondary rotary elements 14, 15, can present changeable and/or shiftable parts, so as to consent the variation of the values of the radii R1 and R2.

It is believed that the invention will have been clearly understood from the foregoing detailed description of a preferred embodiment. Changes in the details of construction may be resorted to without departing from the spirit of the invention, and it is accordingly intended that no limitation be implied and that the hereto annexed claims be given the broadest interpretation to which the employed language fairly admits.

What is claimed is:

1. A device for transferring rod-like articles, from a longitudinal rectilinear supply path along which the rod-like articles move in their axial direction in alignment with respect to one another, to a subsequent path which is transverse to the supply path and along which the rod-like articles move in a direction transverse to their axes, said device having at least one pneumatic pick-up head which is adapted to carry at least one rod-like article parallel with respect to the rectilinear supply path, said at least one pneumatic pick-up head being moved along a closed circuit path which is elliptical and which has its major axis parallel to the longitudinal rectilinear supply path, said elliptical path being substantially tangent to said rectilinear supply path at a pick-up zone where said at least one pneumatic pick-up head takes up due to suction said at least one rod-like article, said elliptical path being contained in a plane tangent to the subsequent transverse path at a delivery zone where said at least one pneumatic pick-up head deposits the at least one rod-like article on the subsequent transverse path, comprising: two fixed shafts which are parallel and spaced apart; two main rotary elements which face each other and are rotatably mounted on said two fixed shafts; drive means for rotating one of said main rotary elements; first coupling means for coupling said main rotary elements with each other, said first coupling means including at least one pair of main double cranks each having of an arm integral with two opposed crank pins which rotatably engage the two main rotary elements facing each other, so as to form a first rotary system of the articulated parallelogram type, the arms of the main double cranks always being maintained parallel to one another, a crank pin of at least one main double crank being an extending crank pin which extends beyond the respective main rotary element; a terminating pin mounted in an eccentric position on said extending crank pin, said terminating pin and extending crank pin having axes which form a pair of orbiting axes that are parallel and spaced apart from each other; a pair of secondary rotary elements mounted for rotation about said orbiting axes; and second coupling means for coupling said secondary rotary elements, said second coupling means including at least one pair of secondary double cranks so as to form a second rotary system of the articulated parallelogram type, only one secondary double crank having a crank pin which extends beyond one of said pair of secondary rotary elements so as to form an extension, wherein said at least one pneumatic pick-up head is mounted on said extension, and wherein the other of said pair of secondary rotary elements is driven into rotation and is coupled in such a manner to the fixed main shaft around which it orbits, so as to rotate upon rotation of the main rotary elements.

2. A transferring device according to claim 1, wherein said other of said pair of secondary rotary elements is coupled with the fixed shaft around which it orbits by a toothed belt passed around a first toothed pulley integral with the said other of said pair of secondary rotary elements and around a second toothed pulley integral with the said fixed shaft, said toothed belt having a diameter double that of the diameter of the said first toothed pulley.

3. A transferring device according to claim 2, wherein there are a plurality of toothed belts arranged side by side, each belt passing around at least one toothed pulleys each of which is integral with a secondary rotary element.

4. A transferring device according to claim 1, further comprising a fixed vacuum source and means for providing a duct between said vacuum source and said at least one pneumatic pick-up head, said duct extending inside the extending crank pin of the respective main double crank and inside the terminating pin provided in an eccentric position on said crank pin, as well as inside the arm and inside the other crank pin of the same main double crank, and wherein said other crank pin of the same main double crank extends to the rear surface of the respective main rotary element, where the duct opens to said fixed vacuum source.

5. The device of claim 1, wherein said rod-like articles are cigarettes, wherein said longitudinal rectilinear supply path is substantially horizontal, wherein said rod-like articles are carried along said subsequent transverse path by a rotary fluted drum having an axis of rotation that is parallel to said longitudinal rectilinear supply path, wherein there are a plurality of pneumatic pick-up heads that are maintained parallel to one another, wherein said pick-up zone is located at one extremity of the minor axis of said elliptical path, wherein said delivery zone is located at one extremity of the major axis of said elliptical path, and wherein said pneumatic pick-up heads deposit said rod-like articles inside a flute of said fluted drum.

6. The device of claim 5, wherein said other of said pair of secondary rotary elements rotates with an angular speed which is equal but contrary to that of said pair of main rotary elements.

* * * * *